United States Patent
Hartl et al.

(10) Patent No.: US 12,043,232 B2
(45) Date of Patent: Jul. 23, 2024

(54) SYSTEM FOR THE DIAGNOSIS AND MONITORING OF AIR SUPPLY SYSTEMS AND COMPONENTS THEREOF

(71) Applicant: KNORR-BREMSE SYSTEME FÜR SCHIENENFAHRZEUGE GMBH, Munich (DE)

(72) Inventors: Michael Hartl, Unterhaching (DE); Martin Linner, Schwindegg (DE); Benjamin Behmann, Munich (DE); Jamie Vargas, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 689 days.

(21) Appl. No.: 17/274,056

(22) PCT Filed: Aug. 5, 2019

(86) PCT No.: PCT/EP2019/070962
§ 371 (c)(1),
(2) Date: Mar. 5, 2021

(87) PCT Pub. No.: WO2020/048704
PCT Pub. Date: Mar. 12, 2020

(65) Prior Publication Data
US 2021/0269009 A1    Sep. 2, 2021

(30) Foreign Application Priority Data
Sep. 5, 2018  (DE) .................... 10 2018 215 108.3

(51) Int. Cl.
*B60T 17/22* (2006.01)
*B60T 13/26* (2006.01)
(Continued)

(52) U.S. Cl.
CPC .............. *B60T 17/22* (2013.01); *B60T 13/26* (2013.01); *B60T 17/004* (2013.01); *B60T 17/02* (2013.01); *B60T 2270/406* (2013.01)

(58) Field of Classification Search
None
See application file for complete search history.

(56) References Cited

U.S. PATENT DOCUMENTS 6,450,771 B1    9/2002   Centers et al.
2009/0252632 A1  10/2009  Ivo et al.
(Continued)

FOREIGN PATENT DOCUMENTS

CN    104736403 A    6/2015
CN    105008194 A   10/2015
(Continued)

OTHER PUBLICATIONS

International Search Report and Written Opinion corresponding to PCT/EP2019/070962, dated Oct. 18, 2019.
(Continued)

*Primary Examiner* — Abdhesh K Jha
(74) *Attorney, Agent, or Firm* — Barnes & Thornburg LLP

(57) ABSTRACT

A system diagnoses and monitors air supply systems and includes a compressor with a drive, which is configured to provide pressurized air for the system, an air dryer, which is configured to remove moisture from the compressed air in the system, at least two sensors, wherein one sensor is configured and arranged to detect a status signal of a component to be monitored, and another sensor is configured and arranged to detect a reference signal relating to the component to be monitored, and an evaluation unit which is configured to evaluate the signals of the sensors. The evaluation unit is also configured to convert the sensor signals into
(Continued)

maintenance and control signals based on an evaluation logic, which signals control the operating mode and the maintenance intervals of the air supply system.

13 Claims, 2 Drawing Sheets

(51) Int. Cl.
  *B60T 17/00* (2006.01)
  *B60T 17/02* (2006.01)

(56) References Cited

U.S. PATENT DOCUMENTS

| | | |
|---|---|---|
| 2012/0207621 A1 | 8/2012 | Halttunen |
| 2013/0280095 A1 | 10/2013 | Worden et al. |
| 2013/0294938 A1 | 11/2013 | Worden et al. |
| 2017/0274916 A1 | 9/2017 | Nock et al. |
| 2018/0119602 A1 | 5/2018 | Lu et al. |

FOREIGN PATENT DOCUMENTS

| | | |
|---|---|---|
| CN | 106870342 A | 6/2017 |
| DE | 19804570 A1 | 8/1999 |
| DE | 102005018271 A1 | 10/2006 |
| DE | 102007010557 A1 | 10/2007 |
| DE | 102013101502 A1 | 8/2014 |
| DE | 112013002118 T5 | 1/2015 |
| DE | 102013113555 A1 | 6/2015 |
| DE | 102014113371 A1 | 3/2016 |
| DE | 102016106331 A1 | 10/2017 |
| EP | 2708429 A1 | 3/2014 |
| EP | 3093206 A1 | 11/2016 |
| JP | H05264404 A | 10/1993 |
| JP | 2000064962 A | 3/2000 |
| JP | 2002364553 A | 12/2002 |
| JP | 2005259402 A | 9/2005 |
| JP | 2009281783 A | 12/2009 |
| JP | 2010196617 A | 9/2010 |
| JP | 2015092121 A | 5/2015 |
| RU | 2015138905 A | 3/2017 |
| WO | 2016041756 A1 | 3/2016 |
| WO | 2016177457 A1 | 11/2016 |
| WO | 2017174737 A1 | 10/2017 |
| WO | 2018033827 A1 | 2/2018 |

OTHER PUBLICATIONS

Micaela Caserza Magro et al.; CBM for a fleet of railway vehicles: infrastructure and algorithms; ACTA IMEKO; Dec. 2016, vol. 5, No. 4, 56-63.

Chinese Office Action corresponding to CN 280058117.6 dated Mar. 7, 2024.

SYSTEM FOR THE DIAGNOSIS AND MONITORING OF AIR SUPPLY SYSTEMS AND COMPONENTS THEREOF

CROSS REFERENCE AND PRIORITY CLAIM

This patent application is a U.S. National Phase of International Patent Application No. PCT/EP2019/070962 filed Aug. 5, 2019, which claims priority to German Patent Application No. 10 2018 215 108.3, the disclosure of which being incorporated herein by reference in their entireties.

FIELD

Disclosed embodiments relate to a system for the diagnosis and monitoring of air supply systems and the components thereof.

BACKGROUND

In order to monitor the status of air supply systems, and specifically their compressors of pneumatic brake systems and rail vehicles, the prior art generally uses individual sensors or switches. These are, for example, oil temperature sensors or sensors for monitoring the air outlet temperature.

SUMMARY

Disclosed embodiments provide a system for the diagnosis and monitoring of air supply installations which increases their reliability and makes possible requirement-compatible maintenance intervals for more economically appropriate operation.

BRIEF DESCRIPTION OF FIGURES

Disclosed embodiments are explained in more detail below with reference to the two figures.

DETAILED DESCRIPTION

Figure 1:
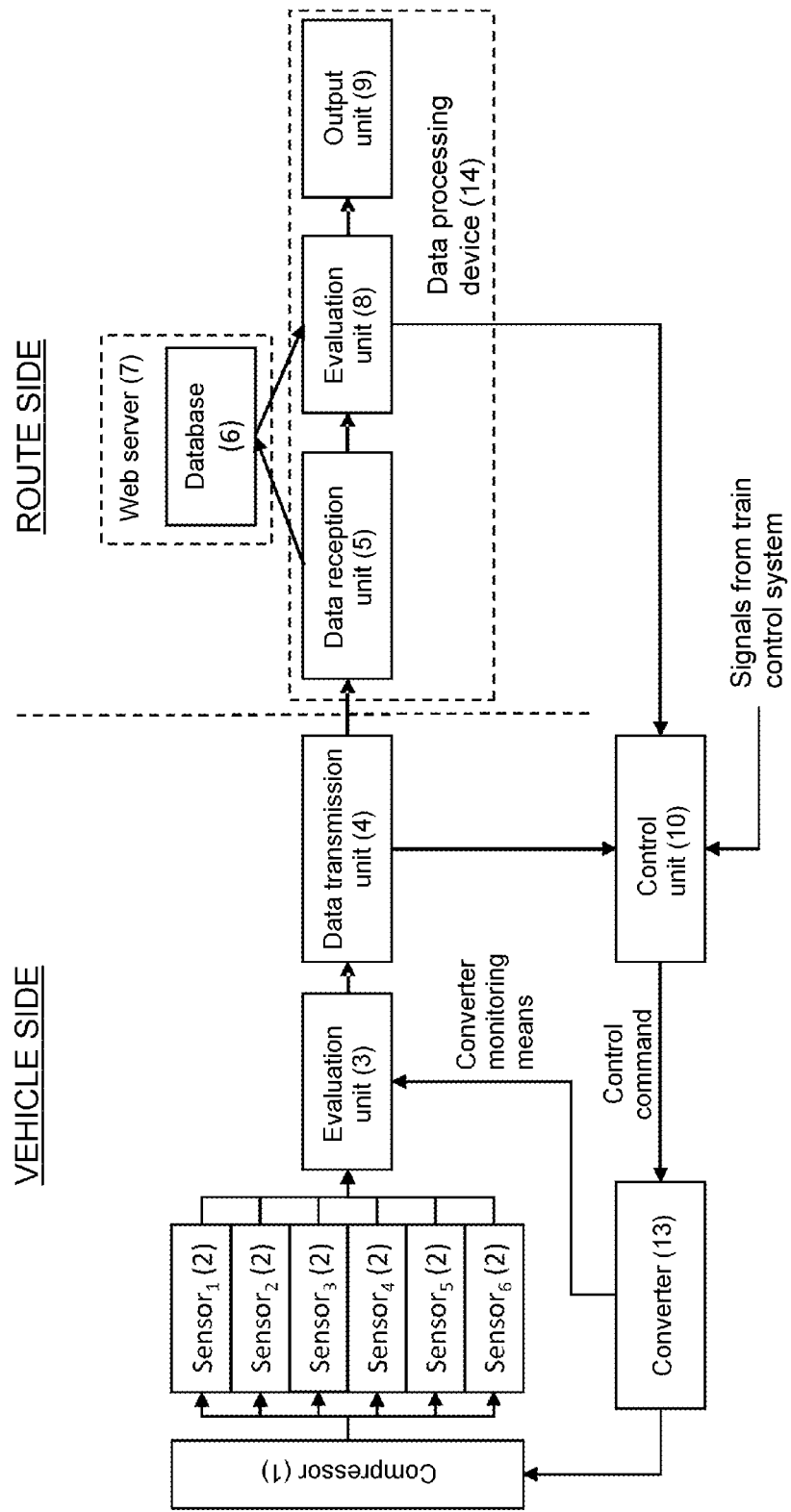
FIG. 1 shows a schematic illustration of an embodiment, wherein the illustration is limited to the monitoring of the compressor of an air supply installation.

As explained above, prior art components generally serve to ensure that a usually safety-relevant maximum limiting value is complied with. These are typically maximum temperature values for the oil temperature or the component temperature itself. The evaluation logics which correspond to the sensors are generally unidimensional, so that a sensor value is compared with the corresponding maximum limiting value, and when the limiting is exceeded an emergency deactivation of the system is triggered.

A disadvantage of this procedure is that genuine status monitoring of the function of a component or components of an air supply system is not provided. All that can be detected is that the function cannot be carried out satisfactorily if a limiting value has been exceeded, and, therefore, emergency deactivation takes place. However, it is not possible to draw any conclusions about the method of functioning before the failure or about the fault which has occurred. In order to prevent failures, maintenance must, therefore, take place according to fixed maintenance intervals. In this context it may be the case that frequent maintenance is performed too early in technical terms even of components on which maintenance would not have to be performed at the given time. This procedure, therefore, has to be considered uneconomic.

A further disadvantage is that since specification requirements on technical installations, such as for example guidelines relating to sound emissions, energy efficiency or the like, are becoming ever more stringent, it would be necessary to make possible and ensure operating modes of the installations which are compatible with requirements. At present this is not possible on the basis of means for monitoring status which have been used until now.

To the contrary, the disclosed embodiments provide a system for the diagnosis and monitoring of air supply installations which increases their reliability and makes possible requirement-compatible maintenance intervals for more economically appropriate operation.

Disclosed embodiments also provide a diagnostic system for air supply installations which permits changes in the status and in the function of an air supply installation and the components thereof to be sensed, to be able to select optimum modes of operation on the basis of this information, in order, on the one hand, to maintain the functioning of the entire system and, on the other hand, to be able to comply with external specification requirements.

Disclosed embodiments provide a diagnostic system for air supply installations which permits changes in the status and in the function of an air supply installation and the components thereof to be sensed, to be able to select optimum modes of operation on the basis of this information, in order, on the one hand, to maintain the functioning of the entire system and, on the other hand, to be able to comply with external specification requirements.

With the acquired information it is, therefore, also possible no longer to organize maintenance intervalls in a rigid way but rather to carry it out only when required and in a way which is tailored to the status of the individual components.

The system according to the disclosed embodiments may have a compressor for providing compressed air for the system, an air drier for extracting moisture from the compressed air, at least two sensors, wherein one sensor senses a status signal of the air supply installation and the other sensor senses a reference signal, and an evaluation unit for evaluating the data which is acquired by the sensors, wherein the evaluation unit is also configured to convert the sensor signals, using an evaluation logic, into maintenance and/or control signals which in turn control the mode of operation or the maintenance interval of the air supply installation.

In one optional embodiment, the sensors sense, depending on the type of the compressor, component and process variables such as a cooling air temperature, an intake temperature, a cylinder wall temperature of a cylinder of the compressor, an oil temperature, an outlet temperature, the final pressure and/or the intake negative pressure, to carry out, on the basis of these parameters, status monitoring and control of a compressor converter which sets a frequency and an amplitude of the voltage present at the compressor, and, therefore, the operating variables of the compressor.

In a further optional embodiment, the sensors sense the temperature of the cooling air inlet as a reference signal, and a component temperature such as for example the temperature of a cylinder wall of the compressor, or an oil temperature, as a status signal, and/or the temperature of the air at the process inlet as a reference signal, and the component temperature, air temperature at the outlet or the oil temperature as a status signal, and/or the intake pressure as a reference signal, and the intermediate pressure as a status signal, or a final pressure which is present after the last compressor stage as a status signal, and/or the air temperature as a reference signal, and the pressure dew point as a status signal on the basis of the measured values relating to the air humidity and the temperature of the compressed process air in the compressor.

In addition, in one optional embodiment has a data transmission unit which transfers the sensor data information already evaluated in a vehicle-side first stage, that is to say one located in the vehicle, together with vehicle information which is also relevant for the evaluation, to a route-side data processing device, that is to say one which is not located in the vehicle, so that the data can be evaluated further there.

In this embodiment, the processing of the data, therefore, takes place in a sequential fashion in multiple stages. Depending on the type and complexity of the evaluation, various functions can, therefore, be performed by different devices.

An advantage of the multi-stage evaluation is, for example, that the vehicle-side evaluation unit only has to have comparatively small computing power. In contrast, the computing power of a central evaluation unit can more easily be expanded when necessary. In addition, further data items which are not accessible in the vehicle itself, such as for example the data of other vehicles, can be taken into account and, therefore, more comprehensive evaluation can take place. It is, therefore, possible to use a central, route-side evaluation unit to compare, for example, similar vehicle configurations worldwide. Therefore, the central evaluation unit can learn, for the respective evaluation case, from other vehicles or vehicle fleets if the same problems occur generally but are not known to the individual vehicle. Therefore, the evaluation is provided with a significantly larger quantity of data to detect possible faults in advance.

In the optional embodiment which has already been described in the paragraph above, the route-side data processing device is to be considered part of the system and has at least one database and/or web server.

In the optional embodiment which has already been described above in the two paragraphs, the communication takes place optionally via WLAN and/or mobile radio, to ensure prompt exchange of data which functions over relatively large distances.

In a further optional embodiment, the route-side device is configured to be able to store the data from various vehicles over the long term and has an output unit to be able to output the data in a collective form to operators.

In a further optional embodiment, the sensors and the vehicle-side evaluation unit are arranged in a CAN bus network, wherein the evaluation unit functions as a bus master, or an Ethernet. If necessary, the sensors have signal converters which convert the signals such that they can be transferred in the corresponding network. The sensor signals are optioinally conducted over screened lines from the sensors to the evaluation unit here.

Furthermore, in a further optional embodiment, the system has signal converters at the positions at which a signal must be converted, which converters convert, for example, the sensor signals for transmission to the evaluation unit or for transmission to the route-side data reception unit. If signals have to be converted relatively frequently for transmission between different components of the system, a plurality of signal converters are correspondingly provided. These converters can be embodied already integrated into the sensors.

In a further optional embodiment, the system is implemented in the central brake control device. The evaluation unit can, therefore, additionally access further diagnostic and control signals of the vehicle, such as for example data of the frequency converter of the compressor of the air supply installation, weather data or information about the current vehicle operation.

Sensors 2 in FIG. 1 sense the operation relevant temperatures and pressures of a compressor 1. In this context some of the sensors sense status signals of the compressor 1, such as for example a cylinder wall temperature, an oil temperature, an intermediate pressure between two compressor stages, a final pressure downstream of the last compressor stage or indirectly a pressure dew point on the basis of the measured values relating to the air humidity and the temperature of the air in the compressor. The other part of the sensors sense parameters whose measurement signals serve as reference signals. These parameters are, for example, the external air temperature, the intake air temperature, the cooling air temperature or the intake pressure. The sensor system is constructed here such that a reference signal of the same type is sensed for each status signal. In this context, a reference signal can also serve as a reference for a plurality of status signals.

A description of an exemplary arrangement of a selection of sensors is explained below with reference to FIG. 2.

In addition, an evaluation unit 3 is provided which evaluates the determined signals of the sensors 2. The sensors 2 and the evaluation unit 3 are arranged here in a CAN bus network (not shown), wherein the evaluation unit 3 represents the CAN bus master. In order to transfer the sensor data, the signals are converted into CAN bus signals by means of signal converters.

Simple evaluation processes such as for example comparisons between a status signal and a reference signal or comparisons between a status signal and a corresponding maximum value can be carried out in the evaluation unit 3. The results of these comparisons are passed on together with all the vehicle-relevant data, or all the sensed sensor signals, to a data transmission unit 4.

The latter passes on the data either to a control unit 10 of an air supply installation or to a route-side data reception unit 5. The control unit 10 processes the information into control commands to the air supply unit and thus to the compressor 1, as a result of which changes in the mode of operation of the compressor 1 can be implemented by means of actuation of a converter 13 of the compressor 1. In addition, the evaluation unit 3 can also access internal signals of a converter monitoring means such as, for example, the converter temperature and the power consumption. It is, therefore, possible to react to unforeseen situations, and derive consequences for the operating behavior, quickly and in a short time.

By integrating the control unit into an entire train control system, the signals of the diagnostic device can be overridden by signals from the train control system in the event of an unavoidable emergency operation. It is, therefore, possible to weight the signals in the control unit.

By transferring the data to a data reception unit 5 of a route-side data processing device 14, it is possible to make the data accessible to various users in the long term in a database, and in the present embodiment via a web server 7.

Furthermore, the data pass from the data reception unit 5 to a central route-side evaluation unit 8. The latter also has a connection to the database of the web server 7 and, therefore, also has access to additional information which has not been sensed by the sensors of the vehicle. On the basis of this additional information and computing power which can be easily expanded, for example in a computing center, it is possible to carry out more comprehensive evaluation of the data.

The results of this evaluation are subsequently output to the users via an output unit 9 of the route-side data processing device 14 or are transmitted back to the control unit 10 via a reception unit which is integrated into the control unit 10, which control unit 10 in turn brings about a change in the operating strategy of the compressor 1.

If the system detects, for example, that there is a risk of the maximum temperature of a cylinder of a piston compressor or of the oil temperature of a screw compressor being exceeded, the control unit 10 can reduce the rotational speed of the compressor so that the further temperature input into the system is reduced and the permissible temperatures are complied with and a minimum necessary system pressure can nevertheless be ensured.

In the case of compressors in which the operating temperature is not reached owing to a low air requirement and as a result there is a risk of compressor damage as a result of collection of water in the oil, the combination of monitoring of the compressor and the control unit provides the possibility of applying an increase in rotational speed of the compressor 1. Therefore, the compressor is operated at the upper permissible pressure level, as a result of which the increased temperature level for damping the water is reached more quickly. At the same time a valve is opened to avoid increasing the pressure level in the vehicle itself further, and so that water in the form of steam can pass out of the system as quickly as possible. As a result of the increase in rotational speed it is, therefore, possible, through the more rapid discharging of the water, to eliminate more quickly the risk of damage to the compressor through the collection of water in the oil, that is to say during operation at a relatively low rotational speed. Likewise, when necessary the cooling capacity of the electrical fans for cooling the compressor or converter can be increased or else reduced. Therefore, both operationally conditioned influences and external influences can be achieved selectively and requirement-compatible countermeasures can be taken.

It is to be noted that in other embodiments the evaluation of the sensor data can be carried out exclusively on the vehicle side, that is to say in the vehicle itself, or exclusively on the route-side, that is to say outside the vehicle.

Figure 2:
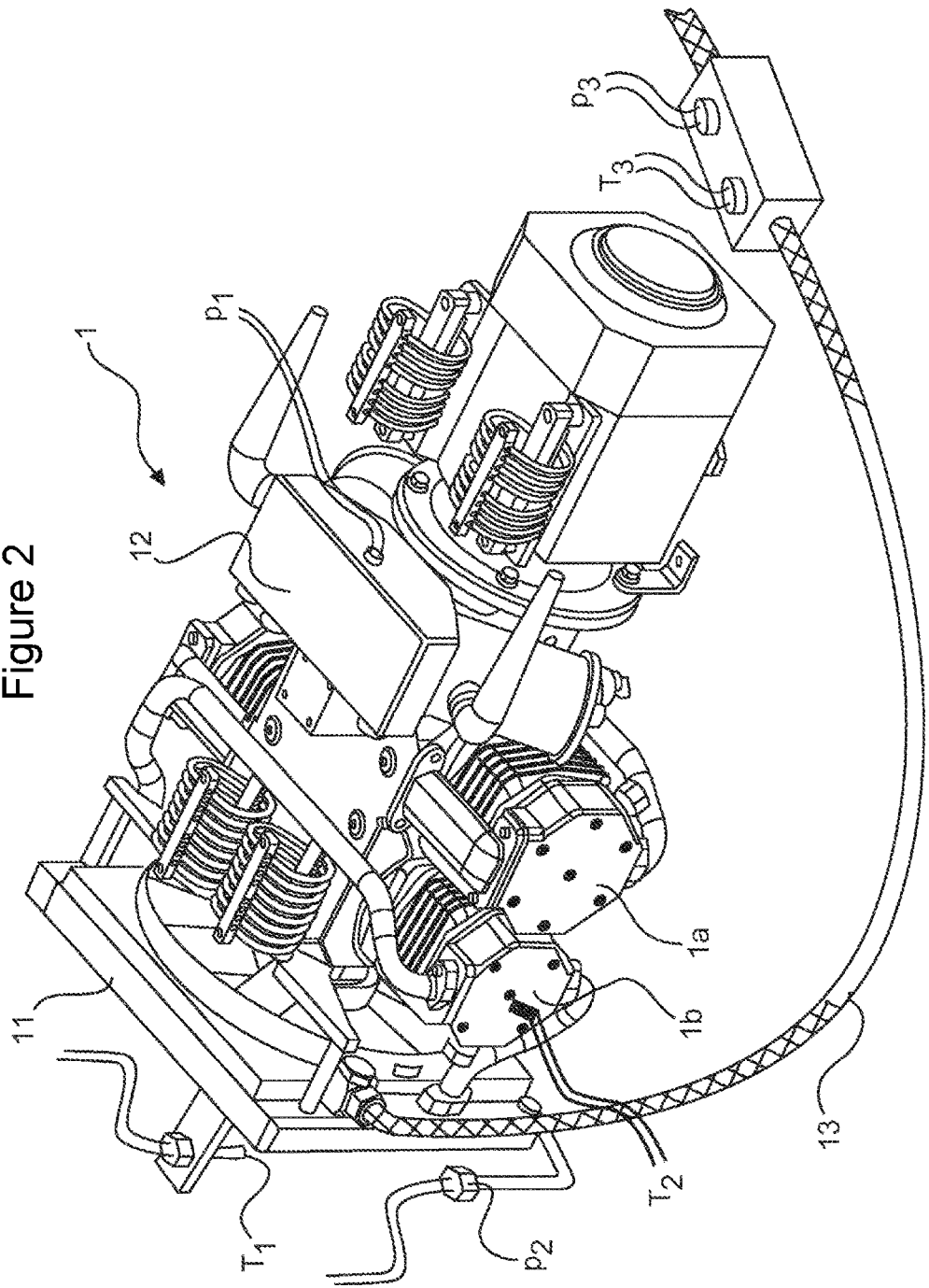
FIG. 2 shows an embodiment of a possible arrangement of the sensors for monitoring the compressor of an air supply installation.

FIG. 2 shows a possible arrangement of various sensors for monitoring a compressor 1 of an air supply installation. In the illustrated embodiment, the compressor 1 is a two-stage piston compressor two cylinders heads 1a and 1b on the one side, and a further cylinder head on the other side. Directly next to the cylinders of the compressor, a fan 11 is arranged, which cools the cylinders 1 with ambient air, on the one side. On the other side, an air intake box 12 of the compressor 1 is illustrated. The cylinders are operated by a motor which is located at the opposite ends to the fan 11 of the compressor. On the side with a cylinder there is a low pressure cylinder, which is not shown clearly in the illustrated perspective. On the side with two cylinders, the front, fan-side, smaller cylinder is a high pressure cylinder 1b, and the rear, motor-side cylinder is also a low pressure cylinder 1a.

In the front view of the radiator, it is divided horizontally. In the lower region there is the pressure of the first seal through the two low pressure cylinders (intermediate pressure), and in the upper region the pressure downstream of the second seal (system pressure, final pressure).

A temperature sensor which is arranged directly upstream of the fan 11 measures the temperature of the ambient air directly before it enters the fan 11. This ambient air temperature, therefore, represents the cooling air temperature $T_1$ of the system. A further temperature sensor measures the temperature $T_2$ at the cylinder wall 1b. Finally, a third temperature sensor measures the temperature of the compressed air after it exits the compressor and before it enters an air drier (not illustrated). The hose 13 constitutes here the connection between the compressor 1 and the air drier. This temperature is, therefore, the air drier inlet temperature $T_3$.

A pressure sensor measures the intake negative pressure $p_1$ in the air intake box 12, while a further pressure sensor into the intermediate circuit measures the intermediate circuit pressure $p_2$ between the two compressor stages of the two-stage piston compressor. Analogously to the measurement of the air drier inlet temperature $T_3$, a third pressure sensor measures the final pressure $p_3$ after the air exits the compressor and before it enters the air drier (not illustrated).

On the basis of these measurement signals it is possible to form value pairs composed of a status signal and a reference signal for monitoring the compressor 1. In this context, the air intake temperature $T_1$ can serve as a reference signal, and the cylinder wall temperature $T_2$ and the air dryer inlet temperature $T_3$ can serve as status signals. In an analogous fashion to this, the intake negative pressure $p_1$ can be defined as a reference signal, and the intermediate circuit pressure $p_2$ or the final pressure $p_3$ can be defined as a status signal.

LIST OF REFERENCE SYMBOLS

1 Compressor
1a Cylinder head compressor stage a
1b Cylinder head compressor stage b
2 Sensor
3 (vehicle-side) evaluation unit
4 Data transmission unit
5 Data reception unit
6 Database
7 Web server
8 (route-side) evaluation unit
9 Output unit
10 Control unit
11 Fan
12 Air intake box
13 Hose
$T_1$ Cooling air temperature
$T_2$ Cylinder wall temperature
$T_3$ Air drier inlet temperature
$p_1$ Intake negative pressure
$p_2$ Intermediate circuit pressure
$p_3$ Final pressure

The invention claimed is:

1. A system for the diagnosis and monitoring of air supply installations, the system comprising:
   a compressor configured to provide compressed air;
   an air drier configured to extract moisture from the compressed air in the system;
   at least two sensors, wherein one sensor is configured and arranged to sense a status signal of a component to be monitored, and another sensor is configured and arranged to sense a reference signal relating to the component to be monitored,
   an evaluation unit configured to evaluate the signals of the sensors, wherein the evaluation unit is also configured to convert the sensor signals, using an evaluation logic, into maintenance and/or control signals, which control operation of the air supply installation, wherein the at least two sensors are configured and arranged to determine the temperature at an cooling air inlet as a reference signal and a component temperature or an oil temperature as a status signal, and/or the temperature of the air at the process inlet as a reference signal and the component temperature or the oil temperature as a status signal, and/or the intake pressure as a reference signal and the intermediate pressure or the final pressure as a status signal, and/or the air temperature as a reference signal and the pressure dew point as a status signal based on the measured values relating to the air humidity and the temperature of the air in the compressor.

2. The system of claim 1, wherein at least one of the sensors is configured and arranged such that, depending on the type of compressor, the sensor senses cooling air temperature, intake temperature, cylinder wall temperature, oil temperature, output temperature, final pressure and/or intake negative pressure for monitoring the status and for controlling the compressor.

3. The system of claim 1, wherein the system has a data transmission unit, which is configured to transfer evaluated or non-evaluated information from the vehicle to a route-side data processing device.

4. The system of claim 3, further comprising a route-side data processing device, wherein the evaluation unit comprises a vehicle-side evaluation unit, and the vehicle-side evaluation unit and the route-side data processing device are configured to evaluate the sensor signals in multiple stages.

5. The system of claim 3, wherein the route-side data processing device is part of the system and has at least one database and/or one web server.

6. The system of claim 3, wherein the system is configured such that the transmission of data between the vehicle and the route-side data processing device is carried out by WLAN and/or mobile radio.

7. The system of claim 5, wherein the route-side data processing device is configured to collect the data from different diagnostic systems of different vehicles, and has an output unit which is configured to output the data of different vehicles together.

8. The system of claim 1, further comprising a CAN bus network or an Ethernet, wherein the sensors and the evaluation unit are arranged in the CAN bus network or the Ethernet, and the evaluation unit in the CAN bus network is configured to function as a bus master, wherein the system has signal converters which are configured to convert the signals such that the converted signals are suitable to be transmitted in the corresponding network, or to the route-side evaluation unit.

9. The system of claim 1, further comprising a signal converter configured to convert the sensor signals for transmission to the evaluation unit.

10. The system of claim 1, wherein the evaluation unit comprises vehicle-side evaluation unit, which is implemented in a central brake control device.

11. The system of claim 4, wherein the route-side data processing device is part of the system and has at least one database and/or one web server.

12. The system of claim 11, wherein the system is configured such that the transmission of data between the vehicle and the route-side data processing device is carried out by WLAN and/or mobile radio.

13. The system of claim 5, wherein the system is configured such that the transmission of data between the vehicle and the route-side data processing device is carried out by WLAN and/or mobile radio.

* * * * *